US012249095B2

United States Patent
Kojima

(10) Patent No.: US 12,249,095 B2
(45) Date of Patent: Mar. 11, 2025

(54) SURROUNDINGS SENSING DEVICE FOR WORK MACHINE

(71) Applicant: KOBELCO CONSTRUCTION MACHINERY CO., LTD., Hiroshima (JP)

(72) Inventor: Yuki Kojima, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 374 days.

(21) Appl. No.: 17/907,438

(22) PCT Filed: Mar. 24, 2021

(86) PCT No.: PCT/JP2021/012204
§ 371 (c)(1),
(2) Date: Sep. 27, 2022

(87) PCT Pub. No.: WO2021/200458
PCT Pub. Date: Oct. 7, 2021

(65) Prior Publication Data
US 2023/0105895 A1    Apr. 6, 2023

(30) Foreign Application Priority Data
Mar. 31, 2020    (JP) ................................ 2020-063883

(51) Int. Cl.
*G06T 7/73*    (2017.01)
*E02F 9/26*    (2006.01)
(Continued)

(52) U.S. Cl.
CPC ................ *G06T 7/73* (2017.01); *E02F 9/261*
(2013.01); *G06T 7/11* (2017.01); *H04N 7/181*
(2013.01);
(Continued)

(58) Field of Classification Search
CPC ... G06T 7/73; G06T 7/11; G06T 2207/20021; G06T 2207/30232; G06T 2207/30261;
(Continued)

(56) References Cited

U.S. PATENT DOCUMENTS

| 2016/0205319 A1* | 7/2016 | Oota | E02F 9/261 |
| | | | 348/38 |
| 2017/0146343 A1* | 5/2017 | Matsuo | H04N 13/239 |

(Continued)

FOREIGN PATENT DOCUMENTS

| CN | 109993046 A * | 7/2019 | G06F 18/24 |
| EP | 3 584 120 A1 | 12/2019 | |

(Continued)

OTHER PUBLICATIONS

International Search Report issued Jun. 15, 2021 in PCT/JP2021/012204 filed on Mar. 24, 2021, 2 pages.

(Continued)

*Primary Examiner* — Xuemei G Chen
*Assistant Examiner* — Kyla Guan-Ping Tiao Allen
(74) *Attorney, Agent, or Firm* — Oblon, McClelland, Maier & Neustadt, L.L.P.

(57) ABSTRACT

A specifying part sets: a first end point which is on a straight line and attributes to a first apex of a plurality of apexes of a frame that is at a first side in a front orthogonal direction and closer to a to-machine side; a second end point which is on the straight line and attributes to a second apex of the plurality of apexes of the frame that is at a second side in the front orthogonal direction and closer to the to-machine side; and a midpoint between the first end point and the second end point. The specifying part determines one of the first end point, the second end point, and the midpoint as a coordinate indicative of a position of an object according to an operation pattern of an operating part.

18 Claims, 9 Drawing Sheets

(51) Int. Cl.
*G06T 7/11* (2017.01)
*H04N 7/18* (2006.01)
*E02F 9/08* (2006.01)

(52) U.S. Cl.
CPC ....... *E02F 9/08* (2013.01); *G06T 2207/20021* (2013.01); *G06T 2207/30232* (2013.01); *G06T 2207/30261* (2013.01)

(58) Field of Classification Search
CPC . E02F 9/261; E02F 9/08; H04N 7/181; G05D 1/0038; G06V 20/56
See application file for complete search history.

(56) References Cited

U.S. PATENT DOCUMENTS

| | | | |
|---|---|---|---|
| 2017/0191243 A1 | 7/2017 | Sharp et al. | |
| 2018/0258616 A1* | 9/2018 | Kiyota | G06T 1/00 |
| 2019/0073774 A1* | 3/2019 | Kwant | G06T 7/143 |
| 2019/0164313 A1* | 5/2019 | Ma | G06N 7/00 |
| 2019/0338492 A1 | 11/2019 | Sharp et al. | |
| 2019/0360177 A1 | 11/2019 | Kiyota et al. | |
| 2022/0220697 A1* | 7/2022 | Sharp | E02F 9/24 |

FOREIGN PATENT DOCUMENTS

| | | |
|---|---|---|
| JP | 2017-101419 A | 6/2017 |
| JP | 2017-151815 A | 8/2017 |
| JP | 6232497 B2 | 11/2017 |
| JP | 2018-123646 A | 8/2018 |

OTHER PUBLICATIONS

Extended European Search Report issued on Jun. 14, 2023 in European Patent Application No. 21781724.6, 5 pages.

* cited by examiner

SURROUNDINGS SENSING DEVICE FOR WORK MACHINE

TECHNICAL FIELD

The present invention relates to a surroundings observation device for use in a working machine which detects an object around the working machine.

BACKGROUND ART

For example, Patent Literature 1 discloses a conventional surroundings observation device. In the technique disclosed in Patent Literature 1, a image capturing device takes a captured image of an object (an obstacle in Patent Literature 1). On the basis of the lowermost position of the object in the captured image, a distance from the working machine to the object is calculated (see Paragraph [0027] and FIG. 8 of Patent Literature 1).

However, the lowermost position of the object cannot be always the position closest to the working machine (the closest position) in the captured image. The closest position varies according to operations of the working machine.

CITATION LIST

Patent Literature

Patent Literature 1: Japanese Patent No. 6232497

SUMMARY OF INVENTION

The object of the present invention is to provide a surroundings observation device for use in a working machine which can determine a closest position of an object to the working machine as a coordinate of the object for an operation of the working machine.

Means for Solving the Problems

A surroundings observation device for use in a working machine according to an aspect of the present invention includes: at least one image capturing device which is provided on the working machine to capture an image of an object around the working machine and thereby obtain a captured image; an operating part for operating the working machine; a specifying part for specifying a position of the object in the captured image; a first setting part for setting a detection region where the object is to be detected in the captured image; a responsive action part for executing a predetermined responsive action in a case that the object is in the detection region in the captured image, wherein the specifying part encloses the object with a polygonal frame in the captured image; sets a straight line which passes a point that is on the polygonal frame and is closest to a to-machine side, and extends in a front orthogonal direction, the front orthogonal direction being orthogonal to a forward direction of the working machine in the captured image, and the to-machine side being a side closer to the working machine in the forward direction; sets a first end point which is on the straight line and attributes to a first apex of a plurality of apexes of the polygonal frame that is at a first side on one side in the front orthogonal direction and closer to the to-machine side; sets a second end point which is on the straight line and attributes to a second apex of the plurality of apexes that is at a second side on the other side in the front orthogonal direction and closer to the to-machine side; sets a midpoint between the first end point and the second end point; and determines one of the first end point, the second end point, and the midpoint as a coordinate indicative of the position of the object according to an operation pattern of the operating part.

DESCRIPTION OF EMBODIMENTS

With reference to FIGS. 1 to 7, a surroundings observation device 20 (see FIG. 2) for use in a working machine 1 (see FIG. 1) will be described.

Figure 1:
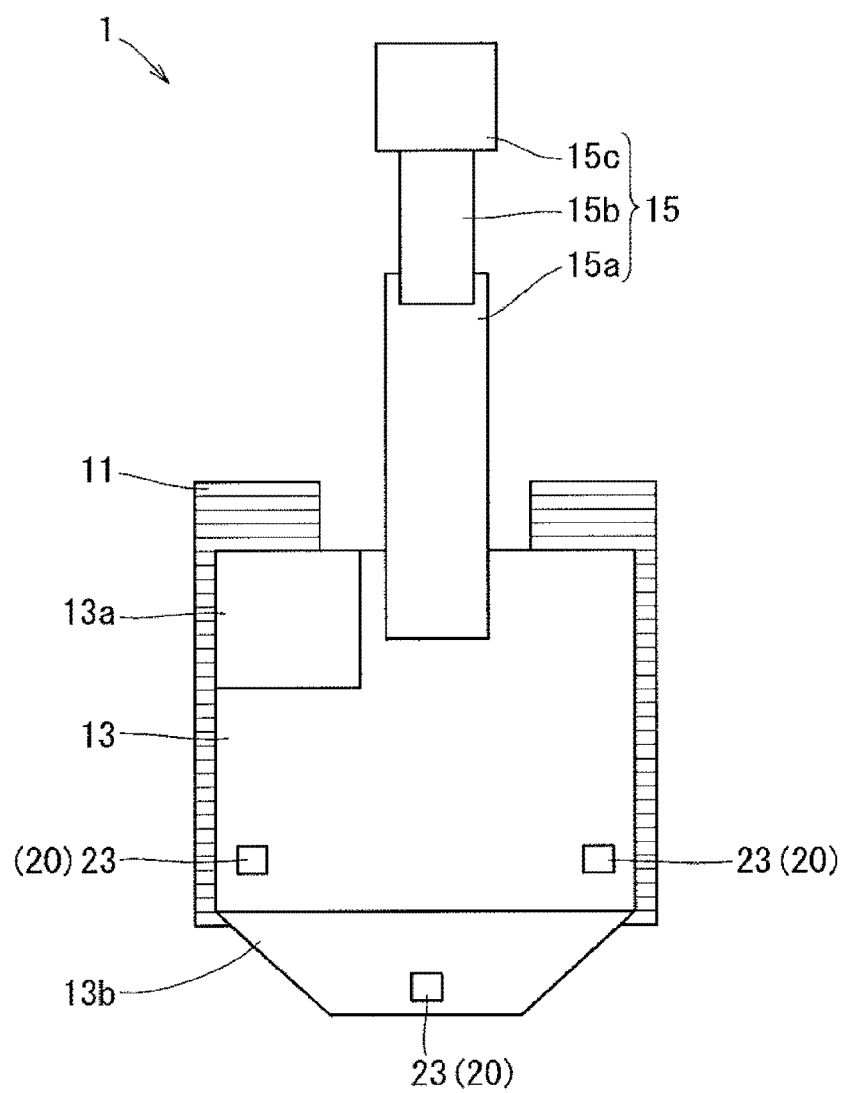
FIG. 1 is a plan view of a working machine.

As shown in FIG. 1, the working machine 1 is a machine for performing a work, e.g., a construction machine for performing a construction work. The construction machine is, for example, an excavator (e.g., hydraulic excavator) or a crane. The following description will be made about the case where the working machine 1 serves as an excavator. The working machine 1 includes a lower traveling body 11, an upper slewing body 13, and an attachment 15.

The lower traveling body 11 causes the working machine 1 to travel. The lower traveling body 11 includes, for example, a crawler, or may include a blade.

The upper slewing body 13 is slewably mounted on the lower traveling body 11. The upper slewing body 13 includes a cab 13a and a counterweight 13b. The cab 13a is a section allowing an operator to operate the working machine 1 aboard. The counterweight 13b is a weight for balancing the working machine 1 in the longitudinal direction thereof.

The attachment 15 is a portion for performing a work and includes, for example, a boom 15a, an arm 15b, and a leading end attachment 15e. The boom 15a is raisably and lowerably attached to the upper slewing body 13. The arm 15b is rotatably attached to the boom 15a. The leading end attachment 15c is provided on a leading end portion of the attachment 15, and is rotatably attached to the arm 15b. The leading end attachment 15c may be a bucket for shoveling up earth and sand, a device (such as a grapple) for nipping an article, or a device (such as a breaker) for crush and excavation.

Figure 2:
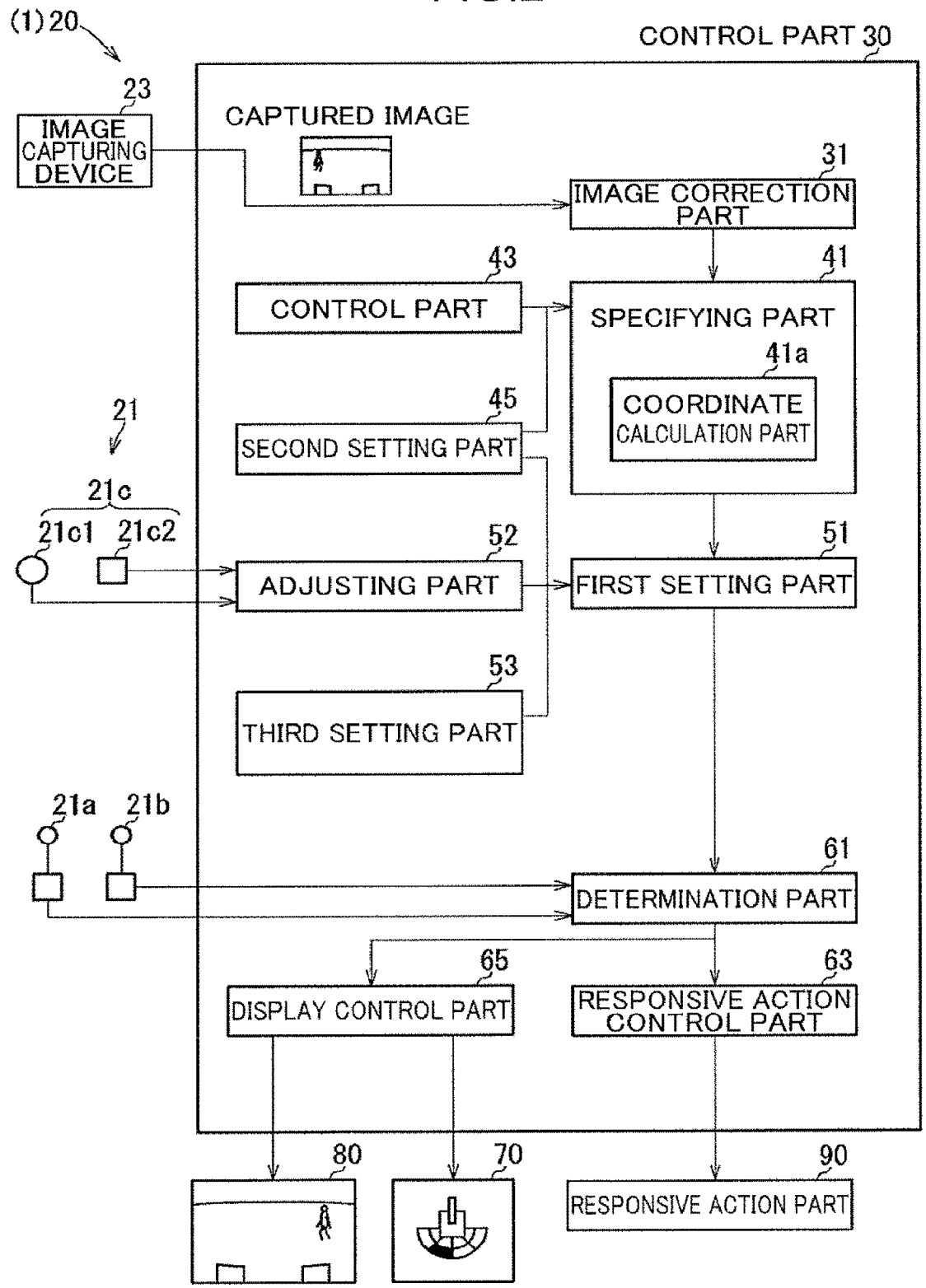
FIG. 2 is a diagram of a surroundings observation device for use in the working machine shown in FIG. 1.

The surroundings observation device 20 detects an article (object A) around the working machine 1. The surroundings observation device 20 detects the object A on the basis of a captured image Im (see FIG. 4). The object A is a person (worker) around the working machine 1, or may be an obstacle other than the person around the working machine 1. As shown in FIG. 2, the surroundings observation device 20 includes an operating part 21, an image capturing device 23, a control part 30, an icon display part 70, a captured image display part 80, and a responsive action part 90.

The operating part 21 is a section for allowing the operator to operate the working machine 1 (see FIG. 1). The operating part 21 is disposed in the cab 13a (see FIG. 1). In the case that the working machine 1 is remotely controlled, the operating part 21 may be disposed at a position away from the working machine 1 (see FIG. 1). The operating part 21 includes a travel operating part 21a, a slewing operating part 21b, and an input device 21c for adjusting a boundary. The travel operating part 21a is a section for causing the lower traveling body 11 (see FIG. 1) to travel (specifically, forward and backward). The travel operating part 21a is a lever (control lever) (the same is applied to the slewing operating part 21b). The slewing operating part 21b is a section for slewing (to the right and to the left) the upper slewing body 13 (see FIG. 1) with respect to the lower traveling body 11 (see FIG. 1). The input device 21c is adapted for adjusting a position of a boundary 13 (see FIG. 4), which will be described later. The input device 21c includes, for example, a jog dial 21c1 and a switch 21c2 (e.g., a push switch). The jog dial 21c1 and the switch 21c2 are integrated, or may be separated.

The image capturing device 23 takes a captured image Im (see FIG. 4) of surroundings including the object A as shown in FIG. 1. The image capturing device 23 monitors the surroundings of the working machine 1. The image capturing device 23 is fixedly attached to the upper slewing body 13. The captured imaging range of the image capturing device 23 preferably covers the blind spots from the operator in the cab 13a. The number of the image capturing device 23 is one, or may be more. The image capturing device 23 is disposed, for example, on a rear portion (e.g., on the counterweight 13b or in the vicinity thereof), a right portion, and a left portion of the upper slewing body 13. In a case that the working machine 1 is remotely controlled, the image capturing device 23 may be disposed on a front portion (e.g., in the cab 13a) of the upper slewing body 13. The image capturing device 23 can captured image over a wide range, for example, with a fisheye lens.

The captured image Im (see FIG. 4) taken by the image capturing device 3 is a two-dimensional image (specifically, video frame), or may be a three-dimensional image (e.g., a captured image taken by a stereo camera). In the captured image Im shown in FIG. 4, a side closer to the working machine 1 is defined as a captured image lower side Y2 (to-machine side) and a side farther away from the working machine 1 is defined as a captured image upper side Y1 (fro-machine side). In the captured image Im, a direction in which the captured image upper side Y1 and the captured image lower side Y2 are connected is defined as a captured image vertical direction Y (forward direction). In the captured image Im, a direction in which the object A approaches or moves away from the working machine 1 by the shortest distance is defined as a forward direction (in FIG. 4, corresponding to the captured image vertical direction Y). In the captured image Im, a direction orthogonal to the forward direction is defined as a front orthogonal direction (in FIG. 4, corresponding to a captured image left-right direction X). One side in the captured image left-right direction X is defined as a captured image right side Xr (a first side). The opposite side to the captured image right side Xr in the captured image left-right direction X is defined as a captured image left side X1 (a second side). Since the terms "upper", "lower", "left", "right" are merely used for convenience of explanation, the image capturing device 23 may be turned or inversed.

The control part 30 (see FIG. 2) performs inputting and outputting of information, computations (determination and settings), and storing of information. The control part 30 shown in FIG. 2 is disposed on the upper slewing body 13 (see FIG. 1), or may be disposed outside the upper slewing body 13 (e.g., in a server). For example, some constituents of the control part 30 are disposed on the upper stewing body 13 and the other constituents thereof are disposed outside the upper slewing body 13. The control part 30 includes an image correction part 31, a specifying part 41, a delimiting part 43, a first setting part 51, a second setting part 45, a third setting part 53, an adjusting part 52, a determination part 61, a responsive action control part 63, and a display control part 65.

The image correction part 31 corrects the captured image Im taken by the image capturing device 23. The image correction part 31 corrects distortion (image distortion) in the captured image Im. Any method is applicable to the correction of the distortion by the image correction part 31. For example, the image correction part 31 may reduce the distortion by expanding or contracting the captured image Im. For example, in the captured image Im, the image correction part 31 may remove a part where there is more distortion while maintaining a part where there is less distortion. A captured image Im resulting from the correction by the image correction part 31 is also referred to as "captured image Im".

Figure 4:
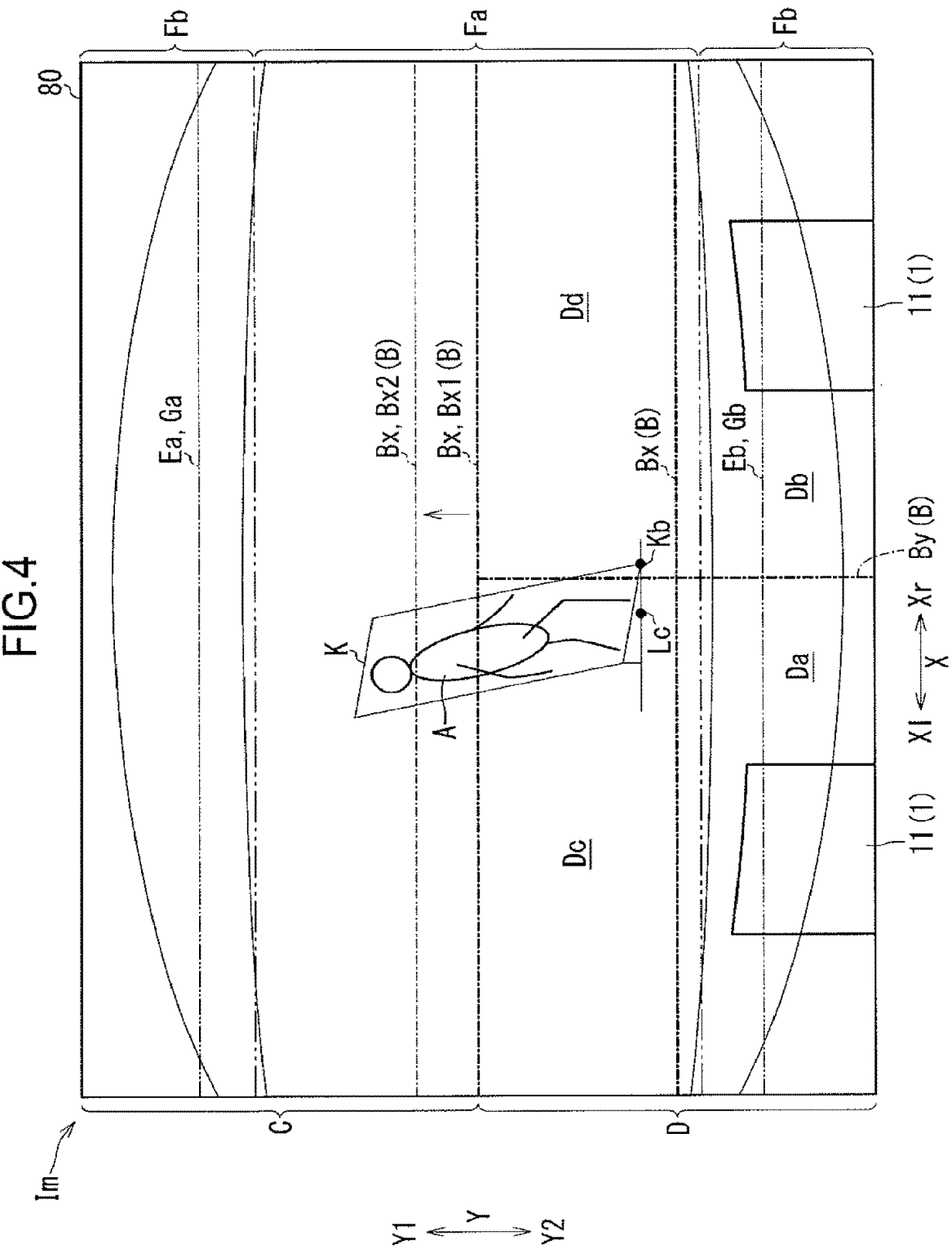
FIG. 4 illustrates a captured image taken by a image capturing device shown in FIG. 2.

The specifying part 41 specifies a position of the object A in the captured image Im shown in FIG. 4. Specifically, the specifying part 41 (see FIG. 2) automatically determines (recognizes, discriminates) by executing image processing whether or not an object in the captured image Im agrees with the object A. The specifying part 41 performs the determination on the basis of the features (e.g., shape, color) of the object in the captured image Im. The specifying part 41 includes a coordinate calculation part 41a. The coordinate calculation part 41a calculates a closest position (coordinate) of the object A to the working machine 1 in the captured image Im. For example, the coordinate calculation part 41a calculates, as the closest position, the coordinate of a part of the object A in the captured image lower side Y2 (e.g., a part under the feet of the worker). The details of the calculation of the coordinate by the coordinate calculation part 41a will be described later.

The delimiting part 43 (see FIG. 2) can set a specific upper limit position Ea (first limit position) and a specific lower limit position Eb (second limit position) in the captured image Im. The specific upper limit position Ea is preset by the delimiting part 43, or may be set manually or automatically (the same is applied to the specific lower limit position Eb). In the case that both of the specific upper limit position Ea and the specific lower limit position Eb are set, the specific lower limit position Eb is set to be closer to the captured image lower side Y2 than the specific upper limit position Ea.

Case 1: In the case that the delimiting part 43 sets the specific upper limit position Ea, a specifying area in which the specifying part 41 (see FIG. 2) specifies the object A is within a region closer to the captured image lower side Y2 than the specific upper limit position Ea. The "within a region" above need not cover the whole of the region, and may be at least a part of the region (hereinafter, the same). The specifying part 41 does not specify the object A in a region closer to the captured image upper side Y1 than the specific upper limit position Ea. Case 2: In the case that the delimiting part 43 sets the specific lower limit position Eb, the specifying area in which the specifying part 41 (see FIG. 2) specifies the object A is within a region closer to the captured image upper side Y1 than the specific lower limit position Eb. The specifying part 41 does not specify the object A in a region closer to the captured image lower side Y2 than the specific lower limit position Eb. Case 3: In the case that the delimiting part 43 sets both of the specific upper limit position Ea and the specific lower limit position Eb, the specifying area in which the specifying part 41 (see FIG. 2) specifies the object A is within a region between the specific upper limit position Ea and the specific lower limit position Eb. The specifying part 41 does not specify the object A in a region closer to the captured image upper side Y1 than the specific upper limit position Ea. In Cases 1, 2, and 3 above, the specifying part 41 does not specify the object A in a part of the captured image Im. Thus, the specifying area of the specifying part 41 is limited in comparison with the case that the specifying part 41 specifies it in the whole of the captured image Im, thereby reducing the processing load and shortening the processing time. The specific upper limit position Ea and the specific lower limit position Eb are set on the basis of, for example, the necessity of specifying the object A.

The specific upper limit position Ea is set as follows. There is a case that a part of the captured image upper side Y1 in the captured image Im has the sky. Specifying the object A in a part having the sky is likely to cause excessive detection or misdetection. Therefore, the specific upper limit position Ea is set on the basis of a part which is presumed to have the sky. For example, the specific upper limit position Ea is set such that a part which is presumed to have the sky is closer to the captured image upper side Y1 than the specific upper limit position Ea.

The specific lower limit position Eb is set as follows. There is a case that a part of the captured image lower side Y2 in the captured image Im has a part of the upper slewing body 13 (see FIG. 1). In this case, the part that has the upper slewing body 13 does not bear the object A. Therefore, the delimiting part 43 sets the specific lower limit position Eb on the basis of a part which is presumed to have the upper slewing body 13. For example, the delimiting part 43 sets the specific lower limit position Eb such that a part which is presumed to have the upper slewing body 13 is closer to the captured image lower side Y2 than the specific lower limit position Eb.

The second setting part 45 (see FIG. 2) sets, in the captured image Im, a high distortion region Fb (first distortion region) and a low distortion region Fa (second distortion region). The high distortion region Fb is preset by the second setting part 45, or may be manually or automatically set (the same is applied to the low distortion region Fa). The low distortion region Fa has less image distortion than the high distortion region Fb.

The second setting part 45 sets the high distortion region Fb and the low distortion region Fa as follows. There is a case that a part of the captured image upper side Y1 and a part of the captured image lower side Y2 are more distorted than a middle part in the captured image vertical direction Y. Therefore, the part of the captured image upper side Y1 and the part of the captured image lower side Y2 in the captured image Im are set as high distortion regions Fb, and the part other than the high distortion regions Fb in the captured image Im is set as a low distortion region Fa. As described above, the part of the captured image upper side Y1 in the captured image Im is presumed to have the sky; thus, omission of specifying the object A therein will not cause the problem. In other words, the specifying area in which the specifying part 41 (see FIG. 2) specifies the object A is within the low distortion region Fa and the high distortion region Fb in the part of the captured image lower side Y2 (i.e., third distortion region). The specifying part 41 does not specify the object A in the high distortion region Fb in the part of the captured image upper side Y1 (i.e., fourth distortion region). Thus, in comparison with the ease that the specifying part 41 specifics it in the whole of the captured image Im, the specifying area of the specifying part 41 is limited, thereby reducing the processing load and shortening the processing time. On the other hand, the specifying part 41 specifies the object A in the high distortion region Fb in the part of the captured image lower side Y2, enabling an appropriate detection of the object A approaching the working machine 1.

There may be a case that all of the specific upper limit position Ea, the specific lower limit position Eb, the high distortion region Fb, and the low distortion region Fa are set. In this case, the specifying part 41 (see FIG. 2) specifies the object A in a region that is between the specific upper limit position Ea and the specific lower limit position Eb and is in the low distortion region Fa, but not in the other region. The case described above, where a part of the captured image upper side Y1 and a part of the captured image lower side Y2 in the captured image Im are set as high distortion regions Fb and a middle part in the captured image vertical direction Y is set as a low distortion region Fa, is merely an example. Which part of the captured image Im becomes the high distortion region Fb and the low distortion region Fa depends on a view angle and a disposition of the image capturing device 23, and a correction by the image correction part 31.

The first setting part 51 (see FIG. 2) sets a detection region D. The detection region D is a region in the captured image Im where the object A is detected, on the basis of which the responsive action part 90 (see FIG. 2) determines whether or not to execute a predetermined responsive action. In the captured image Im, the region other than the detection region D is defined as a non-detection region C. The first setting part 51 sets a plurality of divisions in the captured image Im. In FIG. 4, the first setting part 51 sets four divisions: a lower left division Da, a lower right division db, an upper left division Dc, and an upper right division Dd.

The first setting part 51 sets a boundary B that is a limit of the detection region D in the captured image Im. The boundary B includes a region boundary Bx extending in the captured image left-right direction X and a division boundary By extending in the captured image vertical direction Y. It may be appreciated to set one region boundary Bx, or alternatively a plurality of region boundaries Bx. The region boundaries Bx include at least a limit between the detection region D and the non-detection region C. In the case of a plurality of region boundaries Bx, the region boundary Bx farthest away from the working machine 1 (in the image upper side Y1) is the limit (an extremity of the detection region D) between the detection region D and the non-detection region C. The region boundaries Bx may include a line which separates a plurality of detection regions D from one another. Specifically, the region boundaries Bx may include a line (standard line) that separates the division Da from the division Dc and a line (standard line) that separates the division db from the division Dd. Preferably, the region boundary Bx is set such that the processing load on the control part 30 (see FIG. 2) is minimized. Specifically, the region boundary Bx is a line that extends in the captured image left-right direction X and has a certain (unchangeable) shape. Preferably, the region boundary Bx is substantially linear, more preferably, linear in the captured image Im. The "substantially linear" above covers a curved line along a part (e.g., a rear end of the counterweight 13b (see FIG. 1)) of the upper slewing body 13 (see FIG. 1) in the captured image Im.

Preferably, the region boundary Bx is set in a captured image Im resulting from the correction by the image correction part 31 (see FIG. 2) for the following reason. In a part of the captured image Im where there is more distortion, the actual distance from the working machine 1 to the object A considerably varies due to a position of the object A in the captured image left-right direction X even if the position of the object A in the captured image vertical direction Y is fixed. Thus, in the case that a region boundary Bx which is linear or substantially linear is set in a part of the captured image Im where there is more distortion, whether or not the object A is in the detection region D changes according to the position of the object A in the captured image left-right direction X even if the actual distance from the working machine 1 to the object A is uniform. Thus, the actual distance (responsive action start distance) between the object A and the working machine 1 when the responsive action part 90 (see FIG. 2) starts to execute a responsive action varies according to the position of the object A in the captured image left-right direction X in the captured image fin, which makes it difficult for the operator of the working machine 1 to understand by what distance the approach of the object A to the working machine 1 causes the responsive action to be started (the operator has difficulty in grasping the sense of distance). On the other hand, in this embodiment, a region boundary Bx that is substantially linear or linear is set in the captured image Im resulting from the correction of distortion by the image correction part 31 (see FIG. 2). Thus, the responsive action start distance is uniform or substantially uniform regardless of the position of the object A in the captured image left-right direction X. Therefore, the operator easily grasps the sense of distance. Additionally, since the responsive action start distance is uniform or substantially uniform, the responsive action is properly executed.

The first setting part 51 (see FIG. 2) sets the region boundary Bx in the low distortion region Fa for the same reason as described above. Thus, the responsive action start distance is substantially uniform regardless of the position of the object A in the captured image left-right direction X, allowing the operator to easily grasp the sense of distance. Additionally, since the responsive action start distance is uniform or substantially uniform, the responsive action is properly executed. Further, as described above, there may be a case that a part of the captured image upper side Y1 in the captured image Im has the sky and a part of the captured image lower side Y2 in the captured image Im has the lower traveling body 11. Therefore, setting the region boundary Bx in the low distortion region Fa, which is a middle part of the captured image Im in the captured image vertical direction Y, enables an appropriate detection of the object A. Further, since the region boundary Bx is set in the low distortion region Fa, the object A can be detected earlier in comparison with a case that the region boundary Bx is set in the high distortion region Fb closer to the working machine 1 (in the captured image lower side Y2).

Second Setting Part 45

The second setting part 45 sets the low distortion region Fa (second distortion region) where the region boundary Bx may be set, and the high distortion region Fb (first distortion region) where the region boundary Bx may not be set. The second setting part 45 sets the low distortion region Fa (second distortion region) and the high distortion region. Fb (third distortion region) in the captured image lower side Y2, where the specifying part 41 may perform the specification. The second setting part 45 sets the high distortion region Fb (fourth distortion region) in the captured image upper side Y1, where the specifying part 41 does not perform the specification. A low distortion region Fa (first low distortion region), where the region boundary Bx is set, may be identical to or different from a low distortion region Fa (second low distortion region), where the specifying part 41 specifies the object A. The range suitable for the first low distortion region does not always coincide with the range suitable for the second low distortion region. Thus, the first low distortion region and the second low distortion region are preferably positioned differently. Only one of the first low distortion region and the second low distortion region may be set.

The first setting part 51 (see FIG. 2) may set a plurality of region boundaries Bx. In this case, the first setting part 51 sets the plurality of region boundaries Bx apart from each other in the captured image vertical direction Y. As described later, the responsive action part 90 changes the responsive action according to the region boundary Bx that is crossed by the object A.

In the case that a plurality of image capturing devices 23 (sec FIG. 1) is provided, the first setting part 51 (see FIG. 2) sets a region boundary Bx (for each image capturing device 23) in each of a plurality of captured images Im taken by the plurality of image capturing devices 23. The first setting part 51 sets the region boundary Bx such that the responsive action start distance for each image capturing device 23 is uniform or substantially uniform.

Figure 8:
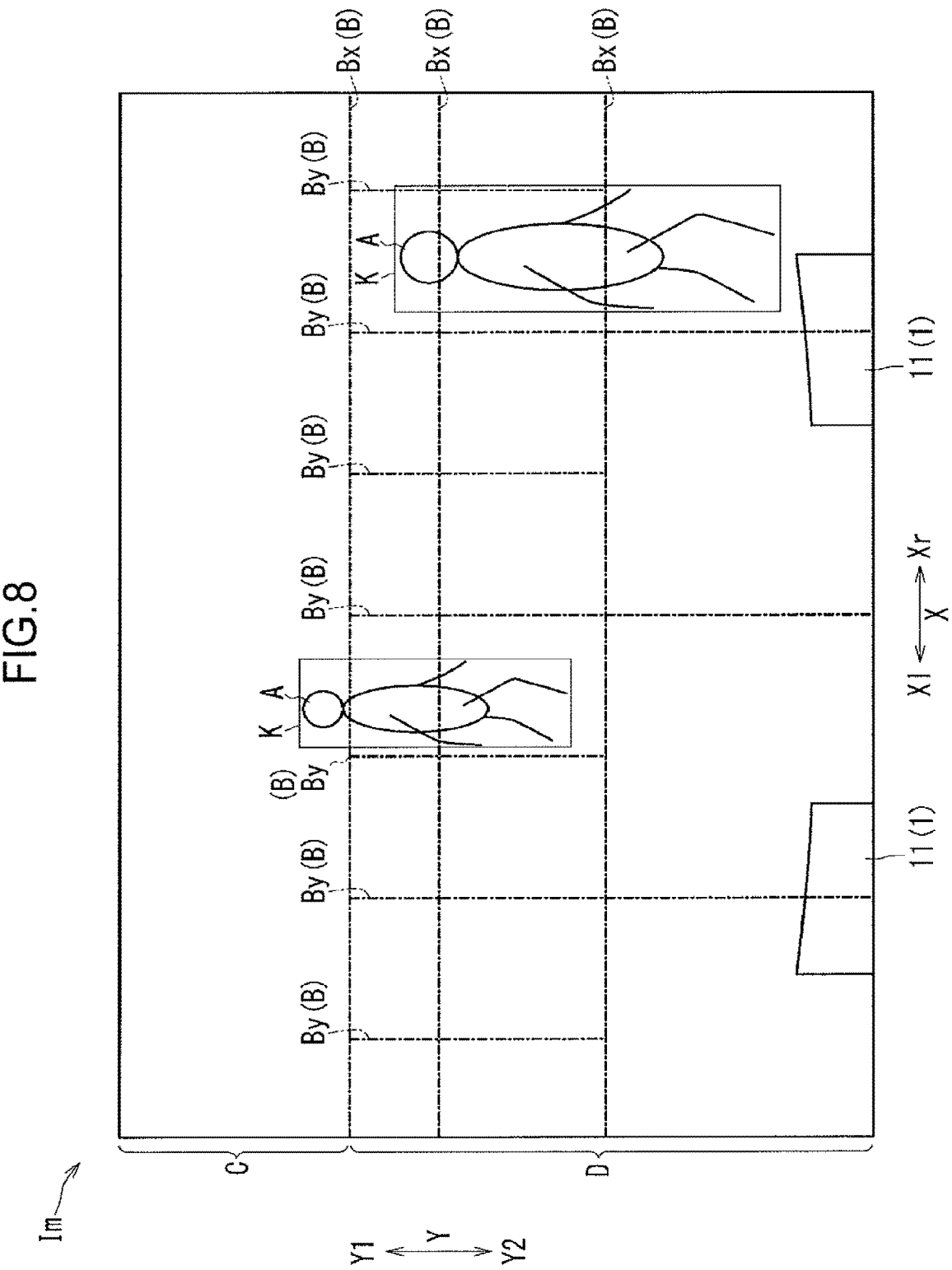
FIG. 8 is similar to FIG. 4 and illustrates a captured image in a modification.

The first setting part 51 sets a division boundary By which divides a plurality of divisions in a juxtaposition of the captured image left-right direction X. The division boundary By extends in the captured image vertical direction Y. The division boundary By is a line having a certain (unchangeable) shape. Preferably, the division boundary By is substantially linear, more preferably, linear in the captured image Im. As shown in FIG. 8, a plurality of division boundaries By may be set. The first setting part 51 may set a plurality of division boundaries By apart from each other in the captured image left-right direction X. The first setting part 51 shown in FIG. 2 includes an adjusting part 52.

The adjusting part 52 adjusts the position of the region boundary Bx shown in FIG. 4 in the captured image vertical direction Y. The shape of the region boundary Bx in the captured image fin is fixed regardless of the adjustment of the position of the region boundary Bx by the adjusting part 52. A change of the position of the region boundary Bx in a part of the captured image Im where there is more distortion requires a change of the curvature of the region boundary Bx in accordance with the distortion of the captured image Im, involving preparation of parameters. However, in this embodiment, the shape of the region boundary Bx is fixed. The adjustment of the position of the region boundary Bx by the adjusting part 52 is manual, or may be automatic.

For example, the position of the region boundary Bx is manually adjusted as follows. The control part 30 (see FIG. 2) is set in "adjustment mode". The captured image display part 80 (see FIG. 2), which will be described later, then superimposes and displays the region boundary Bx on the captured image Ern, at which the operator looks, and performs an operation of determining the position of the region boundary Bx by shifting the region boundary Bx in the captured image vertical direction Y. The operation is performed with the input device 21*c* (see FIG. 2). Specifically, the operator determines the position of the region boundary Bx by turning the jog dial 21*c*1 (see FIG. 2) to shift the region boundary Bx in the captured image vertical direction Y and using (pushing) the switch 21*c*2 (see FIG. 2).

For example, the position of the region boundary Bx is automatically adjusted as follows. The position of the region boundary Bx is adjusted on the basis of, for example, the travel speed of the working machine 1. Specifically, the adjusting part 52 (see FIG. 2) determines the position of the region boundary Bx in the captured image Im when the travel speed of the working machine 1 to the object A is a first speed as a first position Bx1. A travel speed of the working machine 1 to the object A higher than the first speed is defined as a second speed. The position of the region boundary Bx in the captured image Im at the second speed is determined as a second position Bx2. The adjusting part 52 sets the second position Bx2 to be closer to the captured image upper side Y1 than the first position Bx1. The adjusting part 52 may set the position of the region boundary Bx in a portion closer to the captured image upper side Y1 step-by-step or consecutively as the travel speed of the working machine 1 becomes higher. Whether or not the working machine 1 travels toward the object A can be determined on the basis of the direction of the travel (forward, backward) of the lower traveling body 11, the slewing angle of the upper slewing body 13 with respect to the lower traveling body 11, and the direction in which the image capturing device 23 captured images. The position of the region boundary Rx may not be adjusted (i.e., the adjusting part 52 may not be provided). There may be a case that the first setting part 51 presets a region boundary Bx and the position of the region boundary Bx is unchanged.

In the case that the adjusting part 52 adjusts the position of the region boundary Bx, the adjusting part 52 acquires directly or indirectly the travel speed of the working machine 1. For example, the adjusting part 52 shown in FIG. 2 acquires the travel speed on the basis of the operation amount of the travel operating part 21*a*. The adjusting part 52 may acquire the travel speed on the basis of information (number of rotations, flow amount of hydraulic oil) on a motor for causing the lower traveling body 11 (see FIG. 1) to travel. The adjusting part 52 may acquire the travel speed with a sensor for detecting the position of the working machine 1.

The third setting part 53 sets a boundary upper limit position Ga (first utmost position) and a boundary lower limit position Gb (second utmost position) in the captured image Im as shown in FIG. 4. The boundary lower limit position Gb is set to be closer to the captured image lower side Y2 than the boundary upper limit position Ga. The region boundary Bx is set within a region between the boundary upper limit position Ga and the boundary lower limit position Gb. As in the case of the specific upper limit position Ea and the specific lower limit position Eb, the boundary upper limit position Ga and the boundary lower limit position Gb are set on the basis of, for example, the necessity of specifying the object A. In the case that all of the boundary upper limit position Ga, the boundary lower limit position Gb, the high distortion region Fb, and the low distortion region Fa are set, the first setting part 51 sets the region boundary Bx in a region that is between the boundary upper limit position Ga and the boundary lower limit position Gb and is in the low distortion region Fa. In FIG. 4, the boundary upper limit position Ga coincides with the specific upper limit position Ea; however, the boundary upper limit position Ga is not required to coincide with the specific upper limit position Ea (the same is applied to the boundary lower limit position Gb and the specific lower limit position Eb).

The determination part 61 (see FIG. 2) determines whether or not a part or the whole of the object. A is within the detection region D. Specifically, the determination part 61 determines, for example, whether or not the coordinate of an end portion of the frame K in the captured image lower side Y2 (i.e., the lowermost point Kb, which is the closest to the captured image lower side Y2) is within the detection region D. In the case that the region boundary Bx is linear, a simple determination as to whether or not the coordinate of the lowermost point Kb in the captured image vertical direction Y is closer to the working machine 1 (to the captured image lower side Y2) than the coordinate of the region boundary Bx in the captured image vertical direction Y, serves as the determination as to whether or not the object A is within the detection region D.

The responsive action control part 63 (see FIG. 2) causes the responsive action part 90 (see FIG. 2) to execute a predetermined responsive action when an entry by the object A into the detection region D is detected (details will be described later). The responsive action control part 63 does not cause the responsive action part 90 to execute the predetermined responsive action in the case that the entry by the object A into the detection region D is not detected.

The display control part 65 (see FIG. 2) controls display contents of the icon display part 70 and display contents of the captured image display part 80.

Figure 7:
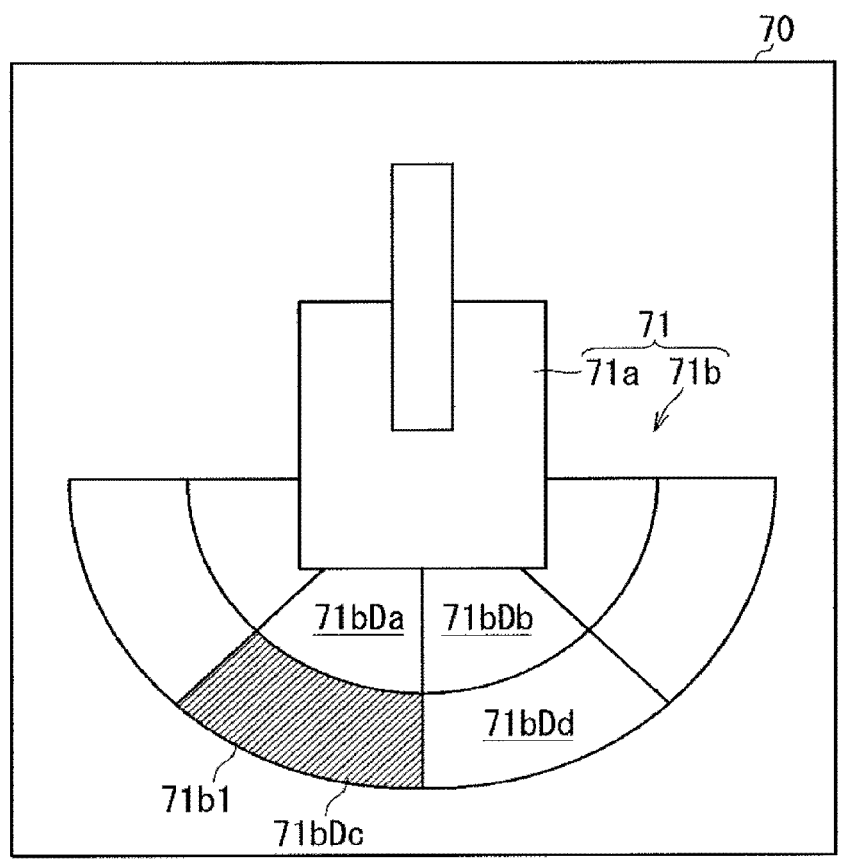
FIG. 7 is an illustration showing an icon displayed on an icon display part shown in FIG. 2.

As shown in FIG. 7, the icon display part 70 displays an icon 71 indicative of the position of the object A (see FIG. 1) with respect to the working machine 1 (see FIG. 1). The icon display part 70 is disposed, for example, in the cab 13*a* (sec FIG. 1). In a case that the working machine 1 is remotely controlled, the icon display part 70 may be disposed outside the working machine 1 (see FIG. 1). The icon display part 70 is a part or the whole of a display. The icon 71 includes a working machine icon 71*a* and an area icon 71*b*. The working machine icon 71*a* is, for example, a graphic representing the working machine 1 (see FIG. 1) in a plan view.

The area icon. 71*h* has graphics representing a plurality of areas (71*b*Da, 71*b*db, 71*b*Dc, and 71*b*Dd) around the working machine 1 (see FIG. 1) in a plan view. The plurality of areas (71*b*Da, 71*b*db, 71*b*Dc, and 71*b*Dd) of the area icon 71*b* corresponds to the plurality of divisions Da, db, Dc, and Dd shown in FIG. 4, respectively. The boundaries of the area icon 71*b* (see FIG. 7) shown in FIG. 7 correspond to the boundaries B in the captured image Im shown in FIG. 4. The area (entered area icon 71*b*1, see FIG. 7) of the area icon 71*b* (see FIG. 7) that corresponds to the division in the captured image Im where the object A is, is highlighted. Specifically, the color of the entered area icon 71*b*1 shown in FIG. 7 is changed, or alternatively the brightness thereof may be changed in comparison with the rest of the area icon 71*b*. The entered area icon 71*b*1 may blink. The highlighting of the entered area icon 71*b*1 enables the operator to easily recognize where the object A is with respect to the working machine 1 shown in FIG. 1.

The captured image display part 80 (see FIG. 2) displays the captured image Im FIG. 4). The captured image display part 80 is disposed, for example, in the cab 13*a* shown in FIG. 1. In a case that the working machine 1 is remotely controlled, the captured image display part 80 (see FIG. 2) may be disposed outside the working machine 1. The captured image display part 80 is a part or the whole of a display. The captured image display part 80 displays the captured image Im (see FIG. 4) taken by the image capturing device 23, with the captured image Im being horizontally inverted like an image reflected in a rearview mirror seen from the cab 13*a*. The captured image display part 80 may display the captured image Im shown in FIG. 4 with at least one of the region boundary Bx, the division boundary By, and the detection region D being superimposed thereon. There may be a case that the region boundary Bx is not displayed on the captured image display part 80 and only used for internal processing such as determination in the determination part 61 (see FIG. 2) (the same is applied to the division boundary By and the detection region D). In the case that a plurality of image capturing devices 23 is provided, the captured image display part 80 switches and displays respective captured images Im of the image capturing devices 23, or alternatively may display a captured image Im obtained by merging captured images Im taken by the plurality of image capturing devices 23.

The captured image display part 80 (see FIG. 2) displays a captured image Im of the image capturing device 23 (see FIG. 1) that captures the object A within the detection region D shown in FIG. 4, allowing the operator to recognize the position where the object A is detected and what the object A is, without manually switching the captured images Im.

Figure 5:
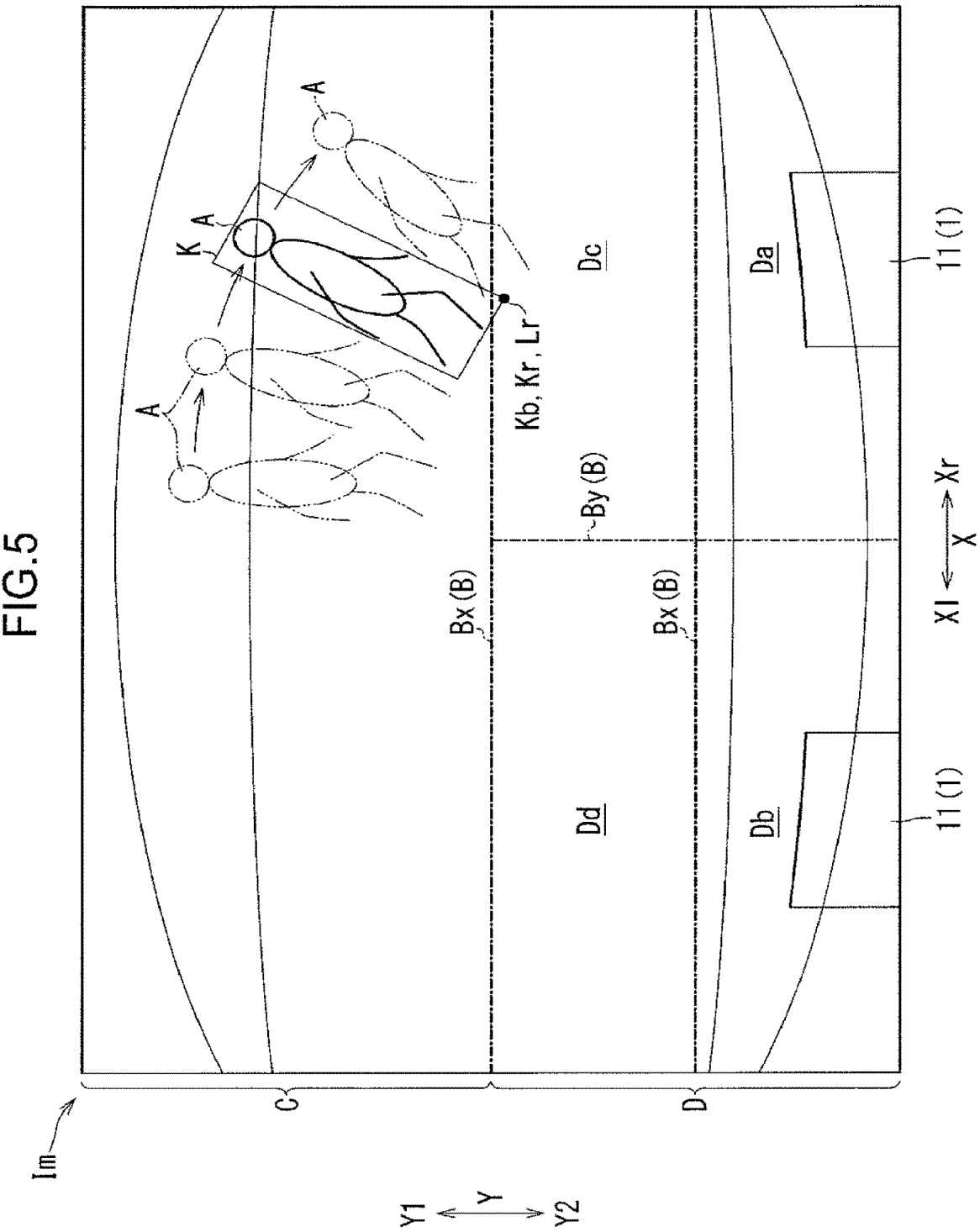
FIG. 5 is similar to FIG. 4 and illustrates a captured image indicative of a case where an upper stewing body shown in FIG. 1 is stewed.

The responsive action part 90 (see FIG. 2) executes a predetermined responsive action in a case that the object is in the detection region D. The responsive action executed by the responsive action part 90 shown in FIG. 2 is a warning, or may be a restriction to an operation of the working machine 1 or another action. In the case that the responsive action executed by the responsive action part 90 is a warning, the warning is given, for example, to the operator of the working machine 1 or to the worker around the working machine 1. The warning is by sound, or may be by light or by an image (including a text, a graphic) on a display, or a combination thereof. In the case that the responsive action executed by the responsive action part 90 is a restriction to an operation of the working machine 1, the restriction is, for example, slowing down or stopping the operation of the working machine 1. The operation of the working machine 1 restricted by the responsive action part 90 is traveling of the lower traveling body 11 shown in FIG. 1, or may be slewing of the upper slewing body 13 with respect to the lower traveling body 11, or an operation of the attachment 15. In the case that a plurality of region boundaries Bx is set as shown in FIG. 5, the responsive action part 90 may change the responsive action according to the region boundary Bx that is crossed by the object A. In this case, the responsive action part 90 may make higher the degree of a warning or a restriction as the object A crosses a closer region boundary Bx to the working machine 1 (to the captured image lower side Y2). For example, the responsive action part 90 changes the pattern of the warning (e.g., the contents, the number of times, the duration of the warning) or the degree of the restriction to an operation of the working machine 1 according to the region boundary Bx that is crossed by the object A.

Operation of Coordinate Calculation Part 41*a*

Figure 6:
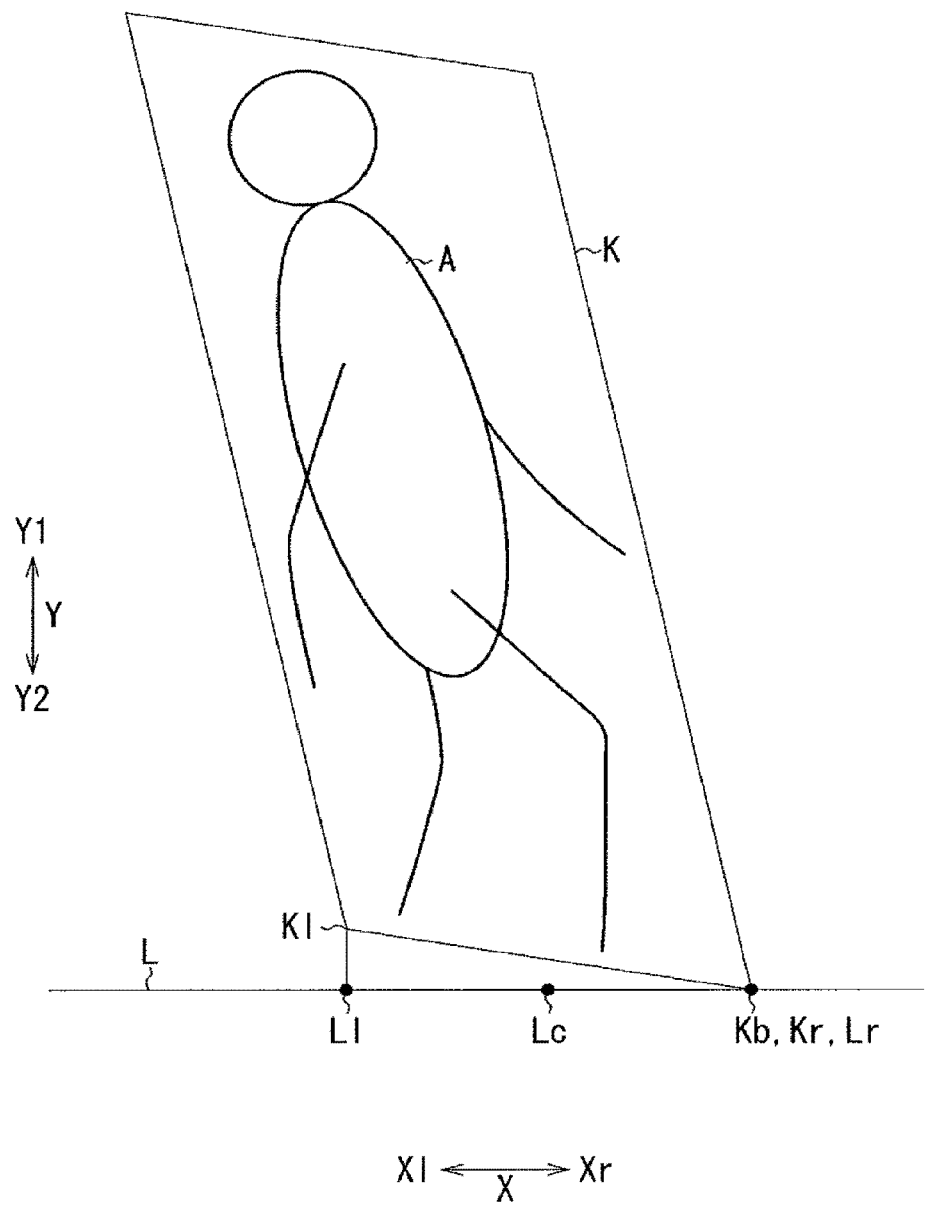
FIG. 6 is an illustration showing an object in the captured image shown in FIG. 4.

The coordinate calculation part 41*a* (see FIG. 2) calculates the position (coordinate) of the object A in the captured image Im shown in FIG. 4 as follows. As shown in FIG. 6, the coordinate calculation part 41*a* encloses the object A with a polygonal frame K. The frame K is, for example, quadrangular, e.g., rhombic or rectangular. The coordinate calculation part 41*a* (see FIG. 2) then sets a straight line L which passes the lowermost point Kb that is on the frame K and extends in the captured image left-right direction X. A point which is on the straight line L and attributes in the captured image vertical direction Y to a lower left point Kl (a first apex that is at the captured image lower side Y2 and the captured image left side X1) of the plurality of apexes of the frame K is defined as a left end point Ll (first end point). A point which is on the straight line L and attributes in the captured image vertical direction Y to a lower right point Kr (a second apex that is at the captured image lower side Y2 and the captured image right side Xr) of the plurality of apexes of the frame K is defined as a right end point Lr (second end point). The point (middle point) in the middle of the left end point Ll and the right end point Lr is defined as a midpoint Lc.

The coordinate calculation part 41*a* shown in FIG. 2 determines one of the left end point Ll, the right end point Lr, and the midpoint Le shown in FIG. 6 as a coordinate indicative of the position of the object A according to an operation pattern of the operating part 21. In this determination, the coordinate calculation part 41*a* (see FIG. 2) determines the one at the closest position to the working machine 1 (see FIG. 1) as the coordinate of the object A. The coordinate calculation part 41*a* is not required to determine the precisely closest one (the closest point) to the working machine 1 as the coordinate of the object A. The coordinate calculation part 41*a* may determine a position in the vicinity of the closest point of the object A to the working machine 1 as the coordinate of the object A. The coordinate calculation part 41*a* preferably determines the closest point of the object A to the working machine 1 as the coordinate of the object A.

In Slewing

When the upper stewing body 13 shown in FIG. 1 is slewed to the left, the position of the object A in the captured image Im shifts to the captured image right side Xr and the captured image lower side Y2 as shown in FIG. 5. The captured image Im shown in FIG. 5, which is taken by the image capturing device 23 (sec FIG. 1), is not horizontally inverted. In this case, the lower right point Kr on the frame K is a position closest to the captured image lower side Y2 (to the side of the working machine 1). Thus, the coordinate calculation part 41*a* shown in FIG. 2 determines the right end point Lr shown in FIG. 6 as the coordinate of the object A when the upper stewing body 13 is stewed to the left with respect to the lower traveling body 11 shown in FIG. 1 by the slewing operating part 21*b*. The "stewed to the left" above means the stewing of the upper slewing body 13 with respect to the lower traveling body 11 such that a background taken in the captured image Im shifts to the captured image right side Xr. Similarly, the coordinate calculation part 41*a* shown in FIG. 2 determines the left end point Ll shown in FIG. 6 as the coordinate of the object A when the upper slewing body 13 is slewed to the right with respect to the lower traveling body 11 shown in FIG. 1 by the slewing operating part 21*b*. The "slewed to the right" above means the slewing of the upper stewing body 13 with respect to the lower traveling body 11 such that the background taken in the captured image Im shifts to the captured image left side X1. As described above, the closest position to the working machine 1 can be set as the coordinate of the object A shown in FIG. 6 in the case that the upper slewing body 13 shown in FIG. 1 is stewed.

In Traveling

The coordinate calculation part 41*a* shown in FIG. 2 determines the midpoint Lc shown in FIG. 6 as the coordinate of the object A when the lower traveling body 11 (see FIG. 1) is traveled by the travel operating part 21*a*. For example, the coordinate calculation part 41*a* shown in FIG. 2 determines the midpoint Lc shown in FIG. 6 as the coordinate of the object A when the lower traveling body 11 is traveled toward the object A shown in FIG. 6 by the travel operating part 21*a*. In this case, the area icon 71*b* (see FIG. 7) that corresponds to the division De where most of the object A shown in FIG. 4 is present, is highlighted as an entered area icon 71*b*1 (see FIG. 7). Therefore, the operator can recognize the position of the object A more accurately. The captured image Im shown in FIG. 4, which is displayed on the captured image display part 80 and taken by the image capturing device 23 (see FIG. 1), is horizontally inverted. The coordinate calculation part 41*a* shown in FIG. 2 may determine the midpoint Lc shown in FIG. 6 as the coordinate of the object A in the case that no operation is performed by the operating part 21. In the case that the travel operating part 21*a* and the slewing operating part 21*b* are simultaneously operated, the right end point Lr or the left end point Ll shown in FIG. 6 may be determined as the coordinate of the object A on the basis of the operation of the slewing operating part 21*b*.

A case that the lowermost point Kb shown in FIG. 4 is set as the coordinate of the object A at all times will be discussed. In FIG. 4, the lowermost point Kb is in the division Dd. On the other hand, most of the object A is present in the division Dc. In the case that the lowermost point Kb is determined as the coordinate of the object A, the icon display part 70 shown in FIG. 7 highlights the area icon 71*b* (71*b*Dd) corresponding to the division Dd. On the other hand, the captured image display part 80 shown in FIG. 4 displays a captured image Im indicating that most of the object A is in the division DC. Therefore, the operator may think that the area highlighted as the entered area icon 71*b*1 on the icon display part 70 shown in FIG. 7 and the detection region D for the object A displayed on the captured image display part 80 shown in FIG. 4 do not coincide with each other. The detection region D and the boundary B are not required to be displayed on the captured image display part 80 shown in FIG. 4. In the case that the detection region D and the boundary B are not displayed, the operator is more likely to think that the display contents on the icon display part 70 (see FIG. 7) and on the captured image display part 80 do not agree with each other.

On the other hand, in this embodiment, there is a case that the midpoint Lc shown in FIG. 4 is determined as the coordinate of the object A for an operation of the operating part 21 shown in FIG. 2. In this ease, the area icon 71*b* (71*b*Dc) shown in FIG. 7, which corresponds to the division Dc where most of the object A is present, is highlighted as the entered area icon 71*b*1, thereby preventing the above-mentioned problem.

Operation

Figure 3:
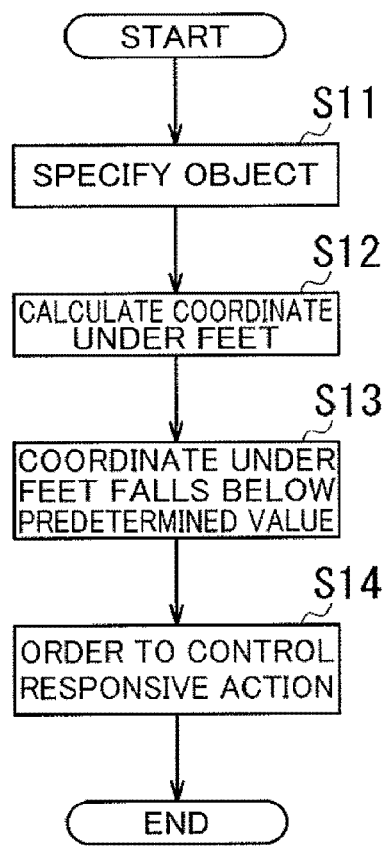
FIG. 3 is a flowchart showing a procedure of a control part shown in FIG. 2.

An operation of the control part 30 shown in FIG. 2 will be described with reference to FIG. 3. The specifying part 41 shown in FIG. 2 specifies the object A in the captured image Im (Step S11), and calculates the coordinate of the object A (e.g., the coordinate under the feet) (Step S12). When the coordinate of the object A in the captured image vertical direction Y falls below the coordinate (a predetermined value) of the region boundary Bx in the captured image vertical direction Y (Step S13), the responsive action control part 63 outputs an order to the responsive action part 90 (Step S14).

Study of Processing Load and Processing Speed

A case in which a coordinate in the captured image Im shown in FIG. 4 is converted into a coordinate on a virtual plane will be discussed. In this case, the following processes are executed. Step 1: The position of the object A in the captured image Im is calculated. Step 2: A coordinate in the captured image Im is converted into a coordinate on a virtual plane based on the working machine 1 shown in FIG. 1 (A region on the virtual plane is created). Step 3: The coordinate of the object A on the virtual plane is calculated. Step 4: The distance from the working machine 1 to the object A on the virtual plane is calculated. Step 5: A responsive action (e.g., a warning, an operational restriction) is executed when the distance from the working machine 1 to the object A falls below a predetermined value.

As described above, in the case that a coordinate in the captured image Im shown in FIG. 4 is converted into a coordinate on the virtual plane, Steps 2, 3, and 4 above require complicated processes, resulting in a high processing load and a long processing time. For example, a calculation of a coordinate of the object A on the virtual plane requires information on an attachment position and an attachment angle of the image capturing device 23 (see FIG. 1), and the logic of the calculation is complicated. A long processing time prolongs the time between an entry by the object A into the detection region D (crossing of the object A over the region boundary Bx) and the starting of the responsive action (or delaying the responsive action). Typically, the attachment position and the attachment angle of the image capturing device 23 vary according to the kind and the specifics of the working machine 1. Thus, it is required to set parameters according to the kind and the specifics of the working machine 1, which is laborious (complicated).

On the other hand, in this embodiment, a coordinate in the captured image Im is not converted into a coordinate on a virtual plane (see FIG. 3), enabling omission of the processes in Steps 2, 3, and 4 above. Thus, the processing load on the control part 30 (see FIG. 2) can be reduced; the processing speed can be increased; and the processing time can be shortened. Accordingly, the time between the entry by the object A into the detection region D and the starting of a responsive action (a warning, an operational restriction) can be shortened (i.e., the responsive action can be quickly executed). Further, since a coordinate in the captured image Im is not converted into a coordinate on the virtual plane, information on the attachment position and the attachment angle of the image capturing device 23 (see FIG. 1) is not required. Thus, even without a complicated setting of parameters, the surroundings observation device 20 (see FIG. 2) is applicable to various kinds of the working machines 1 (i.e., has high versatility).

Comparison with Distance Sensor

Typically, in comparison with a case that the object A is specified with a sensor (e.g., Time Of Flight (TOF) sensor, ultrasonic sensor, infrared sensor, or radio wave (such as millimeter waves) sensor) which acquires dimensional information, specifying the object A by executing image processing on the captured image Im requires a higher processing load and a longer processing time. On the other hand, in this embodiment, the object A is specified only in a part of the captured image Im as described above, thereby reducing the processing load and shortening the processing time. Further, in this embodiment, omission of the processes other than that of specifying the object A (e.g., processes in Steps 2, 3, and 4) results in reducing the processing load on the control part 30 and shortening the processing time. Additionally, in a case that the object A is a person, the surroundings observation device 20 can detect the person only as a detection target; however, a sensor which acquires dimensional information cannot detect the person only as the detection target.

Typically, in comparison with the calculation of a coordinate of the closest point of the object A only by image processing on the captured image Im, calculation of a coordinate of the closest point of the object A from dimensional information acquired by a sensor which can acquire dimensional information, allows an output of a more accurate coordinate of the closest point. On the other hand, in this embodiment, the coordinate of the object A is determined on the basis of an operation of the operating part 21 (see FIG. 2), resulting in obtaining an accurate coordinate of the closest point.

Effects

The effects exerted by a surroundings observation device 20 for use in a working machine 1 shown in FIG. 2 are as follows.

The surroundings observation device 20 includes an image capturing device 23, an operating part 21, a specifying part 41, a first setting part 51, and a responsive action part 90. The image capturing device 23 is provided on the working machine 1 and takes a captured image Im of surroundings including an object A (see FIG. 4) around the working machine 1. The operating part 21 is for operating the working machine 1. The specifying part 41 specifies a position of the object A (see FIG. 4) in the captured image Im.

Configuration 1-1: The first setting part 51 sets, in the captured image Im shown in FIG. 4, a detection region D where the object A is to be detected. The responsive action part 90 (see FIG. 2) executes a predetermined responsive action in a case that the object A is in the detection region D in the captured image Im.

In the captured image Im, a side closer to the working machine 1 is defined as a captured image lower side Y2 (to-machine side); a side farther away from the working machine 1 is defined as a captured image upper side Y1 (fro-machine side); and a direction in which the object A approaches or moves away from the working machine 1 by the shortest distance is defined as a forward direction (in FIG. 4, corresponding to the captured image vertical direction Y). In the captured image Im, a direction orthogonal to the captured image vertical direction Y is defined as a captured image left-right direction X (front orthogonal direction); one side in the captured image left-right direction X is defined as a captured image right side Xr (first side); and the opposite side to the captured image right side Xr in the captured image left-right direction X is defined as a captured image left side Xl (second side). As shown in FIG. 6, the specifying part 41 (see FIG. 2) encloses the object A with a polygonal frame K in the captured image Im and sets a straight line L which passes the lowermost point Kb that is on the frame K and extends in the captured image left-right direction X. In the captured image Im, a point which is on the straight line L and attributes in the captured image vertical direction Y to a lower left point Kl on the frame K (a point that is at the to-machine side and the second side) is defined as a left end point Ll (second end point); a point which is on the straight line L and attributes in the captured image vertical direction Y to a lower right point Kr on the frame K (a point that is at the to-machine side and the first side) is defined as a right end point Lr (first end point); and a point in the middle of the left end point Ll and the right end point Lr is defined as a midpoint Lc.

Configuration 1-2: The specifying part 41 shown in FIG. 2 determines one of the left end point Ll, the right end point Lr, and the midpoint Lc shown in FIG. 6 as a coordinate indicative of the position of the object A according to an operation pattern of the operating part 21.

The following effects can be obtained from Configuration 1-1 above. In Configuration 1-1, a responsive action is executed in a case that the object A is in the detection region D set in the captured image Im. The surroundings observation device 20 (see FIG. 2) does not require a complicated process such as a calculation of a distance on a virtual plane from the working machine 1 to the object A after a conversion of a coordinate of the object A in the captured image Im to a coordinate on the virtual plane, thereby reducing a processing load required for the detection of the object A and shortening processing time. Thus, a delay of the responsive action by the responsive action part 90 (see FIG. 2) in the case that the object A is in the detection region D can be reduced.

The following effects can be obtained from Configuration 1-2 above. The closest point of the object A to the working machine 1 varies according to an operation of the working machine 1 shown in FIG. 4. How the working machine 1 is operated depends on the operation pattern of the operating part 21 shown in FIG. 2. In this regard, the surroundings observation device 20 includes Configuration 1-2 and thereby can determine the closest position to the working machine 1 as the coordinate of the object A shown in FIG. 4 according to the operation pattern of the operating part 21. Thus, for an operation of the working machine 1, the closest position to the working machine 1 can be determined as the coordinate of the object A, resulting in an early detection of the object A.

As shown in FIG. 1, the working machine 1 includes a lower traveling body 11 and an upper stewing body 13 capable of stewing with respect to the lower traveling body 11.

Configuration 2: The specifying part 41 (see FIG. 2) determines the left end point Ll shown in FIG. 6 as the coordinate of the object A when the upper stewing body 13 is slewed (e.g., to the right) with respect to the lower traveling body 11 shown in FIG. 1 by the operating part 21 (stewing operating part 21*b*) shown in FIG. 2 so that a background taken in the captured image Im shown in FIG. 4 shifts to the captured image left side X1. The specifying part 41 (see FIG. 2) determines the right end point Lr shown in FIG. 6 as the coordinate of the object A when the upper stewing body 13 is stewed (e.g., to the left) with respect to the lower traveling body 11 shown in FIG. 1 by the stewing operating part 21*b* (see FIG. 2) so that the background taken in the captured image Im shown in FIG. 4 shifts to the captured image right side Xr.

Configuration 2 allows setting the closest position to the working machine 1 shown in FIG. 4 as the coordinate of the object A for a direction of the slewing (to the right or left) of the upper slewing body 13 shown in FIG. 1, resulting in an early detection of the object A.

Configuration 3: The specifying part 41 shown in FIG. 2 determines the midpoint Lc shown in FIG. 6 as the coordinate of the object A when the lower traveling body 11 (see FIG. 1) of the working machine 1 is traveled by the operating part 21 (travel operating part 21*a*).

Configuration 3 allows determining the closest position to the working machine 1 as the coordinate of the object A when the lower traveling body 11 (see FIG. 1) is traveled, resulting in an early detection of the object A.

Configuration 4: The surroundings observation device 20 includes an icon display part 70 as shown in FIG. 2. The first setting part 51 sets a plurality of divisions Da to Dd in the captured image Im as shown in FIG. 4. As shown in FIG. 7, the icon display part 70 displays an area icon 71b indicative of a plurality of areas around the working machine 1 (see FIG. 1) corresponding to the divisions Da to Dd (see FIG. 4). The icon display part 70 highlights the area icon 71b (entered area icon 71b1) that corresponds to the division where the object A is in the captured image Im shown in FIG. 4.

Configuration 4 enables the operator looking at the icon display part 70 shown in FIG. 7 to recognize which area around the working machine 1 (see FIG. 1) the division (the region in the captured image Im) where the object A is corresponds to, thereby encouraging the operator to perform an appropriate avoiding operation (operation of avoiding a contact of the working machine 1 with the object A).

Configuration 5: The surroundings observation device 20 shown in FIG. 2 includes a captured image display part 80 for displaying the captured image Im and a plurality of image capturing devices 23 shown in FIG. 1. The captured image display part 80 shown in FIG. 2 displays a captured image Im (see FIG. 4) of the image capturing device 23 (see FIG. 1) that captures the division (see FIG. 4) corresponding to the highlighted area icon 71b (entered area icon 71b1, see FIG. 7).

Configuration 5 allows for confirming a background that is in the division where the object A is and the object A on the captured image display part 80 as shown in FIG. 4, thereby enabling the operator to recognize the position of the object A and what the object A is.

Configuration 6: The first setting part 51 (see FIG. 2) sets a division boundary By which divides a plurality of divisions in a juxtaposition of the captured image left-right direction X. The division boundary By extends linearly in the captured image vertical direction Y.

Configuration 6 results in: reducing a processing load caused by the determination as to which of the divisions juxtaposed in the captured image left-right direction X the object A is in; and shortening processing time, in comparison with a case that the division boundary By is not linear (is curved).

Configuration 8: The first setting part 51 (see FIG. 2) sets a region boundary Bx that is a limit of the detection region D in the captured image Im. The region boundary Bx extends in the captured image left-right direction X and has a certain shape.

Configuration 8 results in reducing the processing load caused by a determination as to whether or not the object A is in the detection region D (see Configuration 1-1 above) in comparison with a case that the shape of the region boundary Bx is changeable. Thus, the processing load required for the detection of the object A can be reduced and the processing time can be shortened, thereby reducing a delay of the responsive action by the responsive action part 90 (see FIG. 2) in the case that the object A is in the detection region D.

Configuration 9: The region boundary Bx is linear in the captured image Im.

Configuration 9 results in further reducing the processing load caused by the determination as to whether or not the object A is in the detection region D (see Configuration 1-1 above).

Configuration 10: The surroundings observation device 20 includes a second setting part 45 as shown in FIG. 2. As shown in FIG. 4, the second setting part 45 sets, in the captured image Im, a high distortion region Fb (first distortion region) and a low distortion region Fa (second distortion region) which is less distorted than the high distortion region Fb. The region boundary Bx is set in the low distortion region Fa.

The following effects can be obtained from Configuration 10 above. In the case that a region boundary Bx which extends in the captured image left-right direction X (i.e., is linear or substantially linear) is set in a region of the captured image Im where there is more distortion, the responsive action start distance varies greatly according to the position of the object A in the captured image left-right direction X of the captured image Im. In this case, the operator of the working machine 1 has difficulty in grasping the responsive action start distance (the sense of distance). Therefore, in Configuration 10, the region boundary Bx is set in the low distortion region Fa, which allows the responsive action start distance to be uniform or substantially uniform regardless of the position of the object A in the captured image left-right direction X of the captured image fin, enabling the operator to easily grasp the responsive action start distance (i.e., the operator easily grasps the sense of distance), thereby encouraging the operator to perform the appropriate avoiding operation.

Configuration 11: The surroundings observation device 20 includes a third setting part 53 as shown in FIG. 2. The third setting part 53 sets, in the captured image Im, a boundary upper limit position Ga (first utmost position) and a boundary lower limit position Gb (second utmost position) closer to the captured image lower side Y2 than the boundary upper limit position Ga as shown in FIG. 4. The region boundary Bx is set within a region between the boundary upper limit position Ga and the boundary lower limit position Gb.

The following effects can be obtained from Configuration 11 above. A part of the captured image upper side Y1 and a part of the captured image lower side Y2 in the captured image Im are presumed to be an inappropriate position for the region boundary Bx (e.g., because of having the sky or the lower traveling body 11). In this regard, in Configuration 11, the region boundary Bx is set within a region between the boundary upper limit position Ga and the boundary lower limit position Gb, enabling an appropriate detection of the object A. For example, a misdetection of detecting an object other than the object A as the object A can be prevented.

Configuration 12: The surroundings observation device 20 (see FIG. 2) includes an adjusting part 52 (see FIG. 2) for adjusting the position of the region boundary Bx in the captured image vertical direction Y.

The view angle and the attachment angle of the image capturing device 23 (sec FIG. 1) are liable to vary within a range of tolerance. Thus, a fixed position of the region boundary Bx in the captured image vertical direction Y causes the responsive action start distance to vary. In configuration 12 above, an adjustment of the position of the region boundary Bx by the adjusting part 52 (see FIG. 2) serves as an adjustment of the responsive action start distance. Thus, the responsive action start distances can be adjusted to be a predetermined distance regardless of the variation in the view angle and the attachment angle of the image capturing devices 23 (i.e., the variation in the view angle and the attachment angle of the image capturing devices 23 can be offset).

There may be a case that the responsive action start distance is required to be changed according to the situation of the working place where the working machine 1 is. In Configuration 12, the responsive action start distance can be changed by adjusting the position of the region boundary Bx with the adjusting part 52, resulting in improvement of usability.

The surroundings observation device 20 (see FIG. 2) that includes Configurations 11 and 12 above adjusts the position of the region boundary Bx within a region between the boundary upper limit position Ga and the boundary lower limit position Gb. Thus, the region boundary Bx is set so that the object A can be appropriately detected, thereby eliminating a wrong adjustment of, for example, adjusting the position of the region boundary Bx to an inappropriate position (e.g., because of having the sky or the lower traveling body 11), resulting in an improvement in the adjustability of the position of the region boundary Bx.

Configuration 13: The position of the region boundary Bx in the captured image Im when a travel speed of the working machine 1 to the object A is a first speed is defined as a first position Bx1. The position of the region boundary Bx in the captured image Im when the travel speed of the working machine 1 to the object A is a second speed higher than the first speed is defined as a second position Bx2. The adjusting part 52 sets the second position Bx2 to be above the first position Bx1 (closer to the captured image upper side Y1) in the captured image Im.

The following effects can be obtained from Configuration 13 above. There may be a case that a higher travel speed of the working machine 1 toward the object A leads to a shorter time before the working machine 1 reaches the object A, resulting in a delay of the responsive action. Configuration 13 can make the object A enter the detection region D at a position farther away from the working machine 1 (i.e., make the responsive action start distance longer) in the case that the travel speed of the working machine 1 is the second (higher) speed, in comparison with the case of the first (lower) speed. Thus, the responsive action can be started earlier in the case of the second (higher) speed than in the case of the first (lower) speed.

Configuration 14: As shown in FIG. 5, the first setting part 51 (see FIG. 2) further sets a standard line Bx in a portion closer to the working machine 1 than the region boundary Bx that is the limit between the detection region D and the non-detection region C. The responsive action part 90 (see FIG. 2) changes the responsive action according to whether the position of the object A is closer to or farther away from the working machine 1 than the standard line Bx.

Configuration 14 above allows a change of the responsive action (e.g., a warning, an operational restriction) according to the distance from the working machine 1 to the object A, enabling an appropriate notification to the operator of, for example, the position of the object A.

Configuration 15: A plurality of image capturing devices 23 (see FIG. 1) are provided. The first setting part 51 (see FIG. 2) sets a region boundary Bx on each captured image Im taken by the plurality of image capturing devices 23 (see FIG. 1).

Configuration 15 above allows setting the responsive action start distance for each image capturing device 23, thereby providing an improved usability. Specifically, each view angle, attachment angle, and attachment position of the plurality of image capturing devices 23 shown in FIG. 1 vary. Thus, if a region boundary Bx is set at a common position for the captured image Im of each image capturing device 23, the responsive action start distance for each image capturing device 23 varies. In this regard, in Configuration 15, a region boundary Bx is set for each image capturing device 23, allowing each responsive action start distance of the plurality of image capturing devices 23 to be uniform or substantially uniform.

Configuration 16: The surroundings observation device 20 includes a delimiting part 43 as shown in FIG. 2. The delimiting part 43 sets a specific upper limit position Ea (first limit position) the captured image Im as shown in FIG. 4. The specifying area in which the specifying part 41 specifies the object A is within a region closer to the captured image lower side Y2 than the specific upper limit position Ea.

The following effects can be obtained from Configuration 16 above. A part of the captured image upper side Y1 in the captured image Im is presumed to be an inappropriate position (e.g., because of having the sky) for specifying the object A. In this regard, in Configuration 16, the specifying area in which the specifying part 41 specifies the object A is within a region closer to the captured image lower side Y2 than the specific upper limit position Ea. Thus, the object A can be specified appropriately. Further, the specifying area of the specifying part 41 (sec FIG. 2) can be limited in comparison with the case that the specifying part 41 specifies the object A in the whole of the captured image Im, thereby reducing the processing load on the specifying part 41 (see FIG. 2) and shortening the processing time.

Configuration 17: The surroundings observation device 20 includes a delimiting part 43 as shown in FIG. 2. The delimiting part 43 sets a specific lower limit position Eb (second limit position) in the captured image Im as shown in FIG. 4. The specifying area in which the specifying part 41 specifies the object A is within a region closer to the captured image upper side Y1 than the specific lower limit position Eb.

The following effects can be obtained from Configuration 17 above. A part of the captured image lower side Y2 in the captured image Im is presumed to be an inappropriate position (e.g., because of having only the upper slewing body 13 (see FIG. 1)) for specifying the object A. In this regard, in Configuration 17, the specifying area in which the specifying part 41 specifies the object A is within a region closer to the captured image upper side Y1 than the specific lower limit position Eb. Thus, the object A can be specified appropriately. Further, in comparison with the case that the specifying part. 41 (see FIG. 2) specifies the object A in the whole of the captured image Im, the specifying area can be limited, thereby reducing the processing load on the specifying part 41 (see FIG. 2) and shortening the processing time.

Configuration 18: The surroundings observation device 20 includes a second setting part 45 as shown in FIG. 2. As shown in FIG. 4, the second setting part 45 sets respective high distortion regions Fb (fourth distortion region and third distortion region) in the captured image upper side Y1 and the captured image lower side Y2. The second setting part 45 sets a low distortion region Fa (second distortion region) having less image distortion than the high distortion region Fb. The specifying area in which the specifying part 41 specifies the object A is within the low distortion region Fa and the high distortion region Fb in the captured image lower side Y2.

The following effects can be obtained from Configuration 18 above. In the captured image Im, the region where there is more distortion, which is a part of the captured image upper side Y1, is presumed to be an inappropriate position (e.g., because of having the sky) for specifying the object A. In this regard, in Configuration 18, the specifying area in which the specifying part 41 specifies the object A is within the low distortion region Fa and the high distortion region Fb in the captured image lower side Y2. Thus, the object A can be specified appropriately. Further, the specifying area of the specifying part 41 (see FIG. 2) can be limited in comparison with the case that the specifying part 41 specifies the object A in the whole of the captured image Im, thereby reducing the processing load on the specifying part 41 (see FIG. 2) and shortening the processing time.

Modifications

Figure 9:
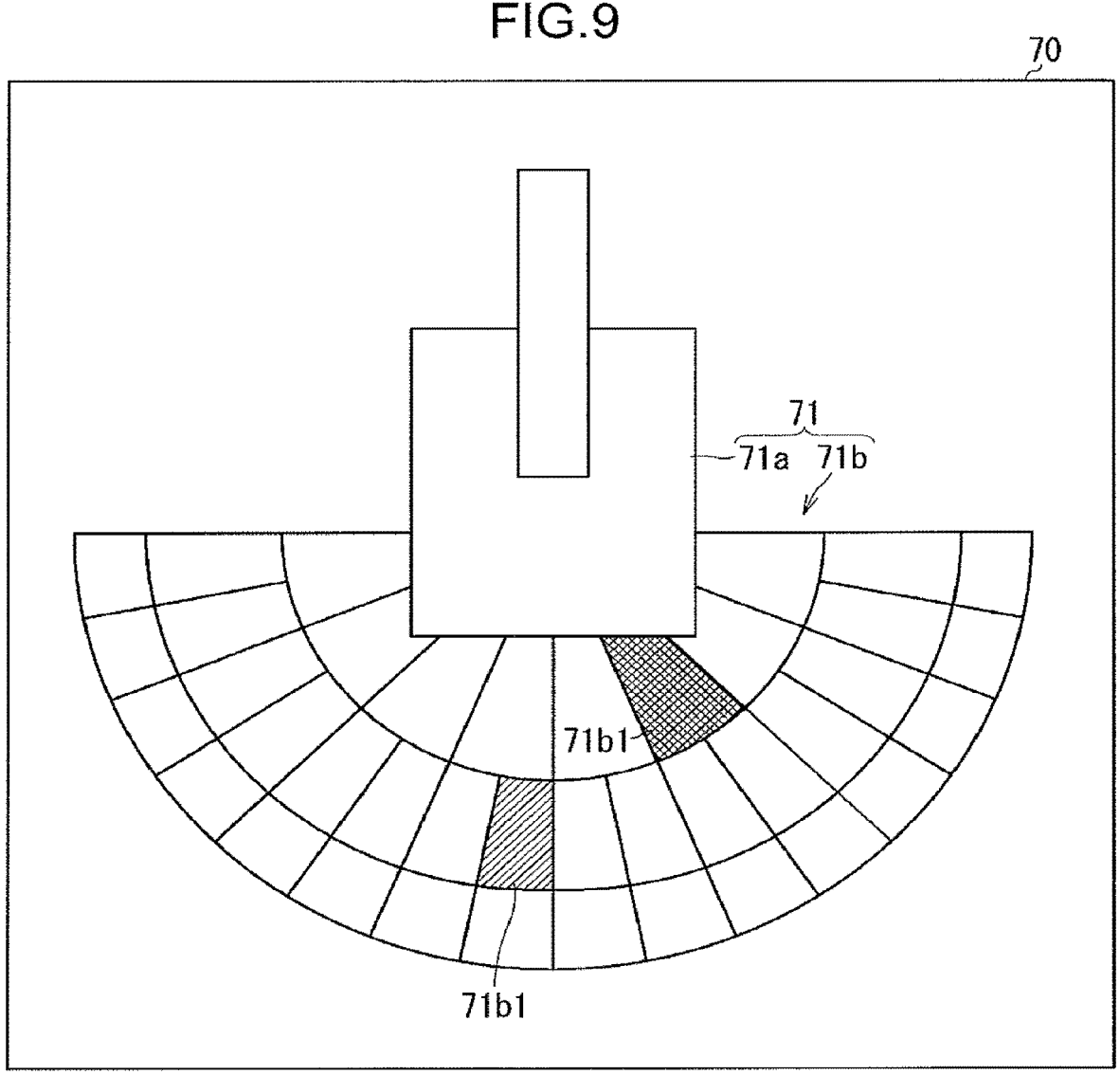
FIG. 9 is similar to FIG. 7 and illustrates an icon in the modification.

As shown in FIGS. 8 and 9, the divisions of the detection region D (see FIG. 8) and the area icon 71b (see FIG. 9) may be subdivided in comparison with the case shown in FIGS. 4 and 7. The subdivision of the divisions of the detection region D and the area icon 71b allows the operator looking at the icon display part 70 (see FIG. 9) to be informed of a more specific position of the object A shown in FIG. 1 and to grasp a more specific position of the object A with respect to the working machine 1. As shown in FIG. 8, the captured image Im depicts an object A closer to the working machine 1 in a larger size and an object A farther away from the working machine 1 in a smaller size. Therefore, it is preferable to set a division farther away from the working machine 1 (in the captured image upper side Y1) to be smaller than a division closer to the working machine 1 (in the captured image lower side Y2) in the captured image Im.

Configuration 7: The first setting part 51 (see FIG. 2) sets a plurality of division boundaries By, which are limits of the divisions in the detection region D, apart from each other as shown in FIG. 8.

In Configuration 7 above, a plurality of divisions of the detection region D is juxtaposed in the captured image Im. Additionally, in Configuration 4, the icon display part 70 displays the area icon 71b corresponding to the divisions in the detection region D as shown in FIG. 9. Thus, in comparison with the case that a plurality of division boundaries is not set, the operator looking at the icon display part 70 (see FIG. 9) can more correctly recognize which area around the working machine 1 shown in FIG. 1 the object A is in.

Other Modifications

The embodiment described above may include various modifications. For example, the connections between the respective constituents in the embodiment shown in FIG. 2 may be changed. Each region (e.g., low distortion region Fa) shown in FIG. 4 and each position (e.g., specific upper limit position. Ea) for defining a region may be fixed, but these regions or positions may be changed manually, or changed automatically according to a condition. The number of constituents may be changed, or alternatively some constituents may be omitted. Constituents described as members or parts different from each other may be combined into one member or one part. A constituent described as a member or a part may be separately provided as members or parts different from each other.

The invention claimed is:

1. A surroundings observation device for use in a working machine, comprising:
   at least one image capturing device which is provided on the working machine to capture an image of an object around the working machine and thereby obtain a captured image;
   an operating part for operating the working machine;
   a specifying part for specifying a position of the object in the captured image;
   a first setting part for setting a detection region where the object is to be detected in the captured image;
   a responsive action part for executing a predetermined responsive action in a case that the object is in the detection region in the captured image, wherein
   the specifying part
   encloses the object with a polygonal frame in the captured image;
   sets a straight line which passes a point that is on the polygonal frame and is closest to a to-machine side, and extends in a front orthogonal direction, the front orthogonal direction being orthogonal to a forward direction of the working machine in the captured image, and the to-machine side being a side closer to the working machine in the forward direction;
   sets a first end point which is on the straight line and attributes to a first apex of a plurality of apexes of the polygonal frame that is at a first side on one side in the front orthogonal direction and closer to the to-machine side;
   sets a second end point which is on the straight line and attributes to a second apex of the plurality of apexes that is at a second side on the other side in the front orthogonal direction and closer to the to-machine side;
   sets a midpoint between the first end point and the second end point; and
   determines one of the first end point, the second end point, and the midpoint as a coordinate indicative of the position of the object according to an operation pattern of the operating part.

2. The surroundings observation device for use in a working machine according to claim 1, wherein
   the working machine includes:
   a lower traveling body; and
   an upper slewing body capable of slewing with respect to the lower traveling body,
   the specifying part
   determines the first end point as the coordinate of the object when the upper slewing body is slewed with respect to the lower traveling body by the operating part so that a background shifts to the first side of the captured image, and
   determines the second end point as the coordinate of the object when the upper slewing body is slewed with respect to the lower traveling body by the operating part so that the background shifts to the second side of the captured image.

3. The surroundings observation device for use in a working machine according to claim 1, wherein
   the specifying part determines the midpoint as the coordinate of the object when a lower traveling body of the working machine is traveled by the operating part.

4. The surroundings observation device for use in a working machine according to claim 1, further comprising:
   an icon display part, wherein
   the detection region is divided into a plurality of divisions, and
   the icon display part
   displays an area icon including a plurality of areas corresponding to the plurality of divisions, and
   highlights, among the plurality of areas, an area corresponding to a division where the object is in the captured image.

5. The surroundings observation device for use in a working machine according to claim 4, further comprising:
   a captured image display part for displaying the captured image, wherein
   the at least one image capturing device includes a plurality of image capturing devices, and
   the captured image display part displays a captured image of the image capturing device among the plurality of image capturing devices that captures the division corresponding to the highlighted area.

6. The surroundings observation device for use in a working machine according to claim 4, wherein
the first setting part sets at least one division boundary which divides a plurality of divisions in a juxtaposition of the front orthogonal direction, and
the at least one division boundary extends linearly in the forward direction.

7. The surroundings observation device for use in a working machine according to claim 4, wherein
the at least one division boundary includes a plurality of division boundaries set apart from each other.

8. The surroundings observation device for use in a working machine according to claim 1, wherein
the first setting part sets a region boundary that is a limit of the detection region in the captured image, and
the region boundary extends in the front orthogonal direction and has a certain shape.

9. The surroundings observation device for use in a working machine according to claim 8, wherein
the region boundary is linear in the captured image.

10. The surroundings observation device for use in a working machine according to claim 8, further comprising:
a second setting part for setting, in the captured image, a first distortion region and a second distortion region which is less distorted than the first distortion region, wherein
the region boundary is set in the second distortion region.

11. The surroundings observation device for use in a working machine according to claim 8, further comprising:
a third setting part for setting, in the captured image, a first utmost position that allows setting the region boundary farthest away from the working machine and a second utmost position that allows setting the region boundary closest to the working machine, wherein
the region boundary is set between the first utmost position and the second utmost position.

12. The surroundings observation device for use in a working machine according to claim 8, further comprising:
an adjusting part for adjusting a position of the region boundary in the forward direction.

13. The surroundings observation device for use in a working machine according to claim 12, wherein
the adjusting part
adjusts the position of the region boundary to a first position in the captured image when a travel speed of the working machine toward the object is a first speed, and
adjusts the position of the region boundary to a second position farther away from the working machine than the first position in the captured image when the travel speed of the working machine toward the object is a second speed higher than the first speed.

14. The surroundings observation device for use in a working machine according to claim 8, wherein
the first setting part further sets a standard line in a portion closer to the working machine than the region boundary,
the responsive action part changes the responsive action according to whether the position of the object is closer to or farther away from the working machine than the standard line.

15. The surroundings observation device for use in a working machine according to claim 8, further comprising:
the at least one image capturing device includes a plurality of image capturing devices, wherein
the first setting part sets the region boundary in each of a plurality of captured images taken by the plurality of image capturing devices.

16. The surroundings observation device for use in a working machine according to claim 1, further comprising:
a delimiting part for setting a first limit position in the captured image, wherein
a specifying area in which the specifying part specifies the object is within a region closer to the working machine than the first limit position.

17. The surroundings observation device for use in a working machine according to claim 1, further comprising:
a delimiting part for setting a second limit position in the captured image, wherein
a specifying area in which the specifying part specifies the object is within a region farther away from the working machine than the second limit position.

18. The surroundings observation device for use in a working machine according to claim 10, wherein
the first distortion region includes a third distortion region and a fourth distortion region, the third distortion region being closer to the working machine than the second distortion region and the fourth distortion region being farther away from the working machine than the second distortion region, and
a specifying area in which the specifying part specifies the object is within the second distortion region and the third distortion region.

* * * * *